United States Patent [19]
Guarini

[11] 3,903,278
[45] Sept. 2, 1975

[54] METHOD OF COMBATING ENTEROBACTER INFECTIONS

[75] Inventor: Joseph R. Guarini, Malvern, Pa.

[73] Assignee: SmithKline Corporation, Philadelphia, Pa.

[22] Filed: Dec. 13, 1973

[21] Appl. No.: 424,598

Related U.S. Application Data

[62] Division of Ser. No. 195,820, Nov. 4, 1971, Pat. No. 3,796,801.

[52] U.S. Cl. .............................................. 424/246
[51] Int. Cl.² ........................................ A61K 31/54
[58] Field of Search .................................... 424/246

[56] References Cited
UNITED STATES PATENTS
3,641,021  2/1972  Ryan................................ 424/246

OTHER PUBLICATIONS

The Merck Index, 8th ed., 1968, Merck & Co., Inc., Rahway, N.J., p. 222.

*Primary Examiner*—Jerome D. Goldberg
*Attorney, Agent, or Firm*—Stuart R. Suter, Ph.D.; Alan D. Lourie, Ph.D.; William H. Edgerton, Ph.D.

[57] ABSTRACT

7-Mandelamido or 7-aminophenylacetamido cephalosporins bearing a 3-heterocyclicthiomethyl substituent are effective in combating Enterobacter infections. Five-membered heterocyclic rings having at least two hetero atoms are preferred.

9 Claims, No Drawings

METHOD OF COMBATING ENTEROBACTER INFECTIONS

This is a division of application Ser. No. 195,820 filed Nov. 4, 1971 now U.S. Pat. No. 3,796,801.

This invention relates to a method of combating Enterobacter infections. In particular, the invention relates to a method of combating Enterobacter infections by administering to an infected or susceptible warm-blooded mammal a cephalosporin compound of formula I.

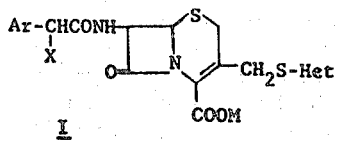

$$\underline{I}$$

where
Ar is phenyl or thienyl;
X is OH or $NH_2$;
M is H or an alkali metal cation, and
Het is a 5-membered heterocyclic ring having at least two hetero atoms from the group consisting of S, N, and O. The heterocyclic ring may be substituted with one or more lower alkyl (1–4 carbons) groups or a trifluoromethyl group.

Cephalosporin compounds have been known for a number of years to possess valuable antibacterial activity, both against Gram-positive and Gram-negative bacteria. They have not, however, been particularly effective against Enterobacter infections. Now we have found that a limited group of cephalosporins, defined by formula I, possesses sufficient activity against infections caused by organisms of the genus Enterobacter to enable them to be used effectively in the treatment or prevention of such infections.

The preferred compounds are those where Het is 1,3,4-thiadiazol-2-yl, 1,3,4-oxadiazol-2-yl, 1,2,4-triazol-3-yl, or 1,2,3,4-tetrazol-5-yl and the C or N-lower alkyl (1 to 4 carbon atoms) or trifluoromethyl derivatives thereof. Particularly preferred are 1-methyl-1,2,3,4-tetrazol-5-yl, 5-methyl-1,3,4-thiadiazol-2-yl, 5-methyl-1,3,4-oxadiazol-2-yl, and 4,5-dimethyl-1,2,4-triazol-3-yl. Other preferred groups are 1-methylimidazol-2-yl, 4-methylthiazol-2-yl, 4-methyl-1,2-4-triazol-3-yl, 5-methyl-1,2,4-triazol-3-yl, 5-ethyl-1,3,4-thiadiazol-2-yl, 5-trifluoromethyl-1,2,4-triazol-3-yl, thiazol-2-yl, 5-methylthiazol-2-yl, 3-methylisothiazol-5-yl, 2-thiazolin-2-yl.

Also included within the scope of the invention are the pharmaceutically acceptable, nontoxic base salts of the compounds. These include alkali and alkaline earth metal salts and organic ammonium salts.

The compounds of the invention are prepared from starting materials which are known, readily prepared by known methods, or described herein.

In particular, they are prepared by a series of reactions, the essential reactions being displacement of the 3-acetoxy group of 7-aminocephalosporanic acid (7-ACA) with the desired heterocyclic thiol compound and acylation of the 7-amino group of 7-ACA with the appropriate glycine or glycolic acid. The order in which these two reactions are carried out is not critical. The displacement reaction can be followed by observing the disappearance of the acetoxy carbonyl band in the infra red absorption spectrum.

The carboxyl group of the glycines and glycolic acids must be activated prior to the acylation of the 7-ACA compound. Methods of activation include conversion to the acid chloride, mixed anhydride, 2,4-dinitrophenyl ester, or N-hydroxysuccinimide ester, or reaction first with a carbodiimide or a carbonyl diimidazole. These methods are all well known to one skilled in the art of chemistry.

When X is $NH_2$, the amino group of the amino acid is protected with one of the well-known protecting groups such as t-butoxycarbonyl, carbobenzyloxy or trichloroethoxycarbonyl. When X is OH, the hydroxy group of the glycolic acid is protected with a common protecting group such as dichloroacetyl, trimethylsilyl, formyl, or tetrahydropyranyl. Following this displacement and/or acylation reactions the protecting group is removed by conventional methods. When X is $NH_2$ and the protecting group has been removed by acid hydrolysis, the zwitterion product may be obtained by several methods. These include utilization of ion-exchange resins or dissolution of the salt in water and adjustment of the pH to the isoelectric point of the compound with a base such as $NaHCO_3$, $NH_4OH$, tributylamine, t-butylamine, or triethylamine.

Purification of the cephalosporin compounds may be effected by conventional chromatographic or recrystallization techniques. In column chromatography, they can be eluted from silica gel columns with 3% or 5% methanol in chloroform or similar solvent systems. When X is OH the cephalosporin may be purified by conversion to its sodium, potassium or similar salt by dissolution of the compound in a suitable solvent, such as methanol or 20% i-propanol in ethyl acetate, and addition of a solution of a salt of a weaker acid, such as sodium methoxide in methanol or potassium 2-ethylhexanoate in isopropanol. The free acid can be regenerated by dissolution of the salt in water, acidifying the solution, and collection of the product.

Due to the assymetric α-carbon of the 7-acetamido substituent, optical isomers can exist. The D-isomer is the preferred isomer; however, it is to be understood that the invention includes also the use of the L-isomer and the racemic D,L-mixture.

Compounds where X is OH are administered by injection. Compounds where X is $NH_2$ are administered orally or by injection. Injectable formulations are prepared by standard methods using the compound or its salt in water or saline solution. Oral formulations, such as capsules, are prepared by standard methods. The dose used to combat Enterobacter infections will vary with the severity of the infection and the age, weight and conditions of the subject, but will generally be in the range of 1–24 gm/day, preferably 2–4 gm/day. The dosage will be divided into smaller doses given 4 times per day, although, when a higher dosage is required, the total may be divided into smaller doses given every 2 hours.

The compounds of this invention have been tested extensively and exhibit unusual and unexpectedly high antibacterial activity against *Enterobacter aerogenes*. In the conventional agar-inclusion test, minimum inhibitory concentrations (MIC's) were as low as 3.1 to 6.3 μg/ml. In particular, 3-(5-methyl-1,3,4-thiadiazol-2-ylthiomethyl)-7-(D(−)-mandelamido)-3-cephem-4-carboxylic acid had a modal MIC of 3.1 μg/ml when tested against 17 strains of Enterobacter. The same compound had a median effective dose ($ED_{50}$) against Enterobacter of 7.2 mg/kg when administered subcutaneously to mice 1 and 5 hours post infection. Under the same test conditions 7-mandelamidocephalosporanic acid had an $ED_{50}$ of 36 mg/kg and 7-(2-tetrazoleacetamido)-3-(5-methyl-1,3,4-thiadiazol-2-ylthiomethyl)-3-cephem-4-carboxylic acid had an $ED_{50}$ of 9.6 mg/kg.

The compound 3-(5-methyl-1,3,4-thiadiazol-2-ylthiomethyl)-7-mandelamido-3-cephem-4-carboxylic acid, as well as the other compounds of formula I, possesses activity against a variety of Gram-positive and Gram-negative bacteria in addition to Enterobacter. Activity against Neisseria gonorrhoeae is high. Activity against S. aureus, S. pyogenes, S. faecalis, D. pneumoniae, E. coli, K. pneumoniae, Salmonella spp., and Shigella spp. is also found. The subcutaneous $ED_{50}$ of this compound against E. coli species was found in different tests to be 3.0, 6.2, 3.6 and 7.5. Its $LD_{50}$ i.v. is approximately 3 g/kg in rats and 2.5 g/kg in mice. It is comparatively free from nephrotoxic effects and its sodium salt is less irritating than either cephalothin or cefazolin.

The following examples are intended to illustrate the preparation of compounds of the invention but are not to be construed as limiting the scope thereof. The MIC values are expressed in μg/ml.

EXAMPLE 1

3-(1-Methyltetrazol-5-ylthiomethyl)-7-D-mandelamido-3-cephem-4-carboxylic acid

To a suspension of 7-ACA (27.2 g, 0.1 mole) in a water-acetone (2:1) mixture (300 ml) was added 5% $NaHCO_3$ until solution was complete and pH 7.5 attained. The reaction solution was heated rapidly to 45° and then 5-mercapto-1-methyltetrazole (17.4 g., 0.15 mole) in acetone (200 ml.) was added. The solution was heated to gentle reflux and maintained at pH 7.5 by addition of 6N HCl. 1.25 Hours after thiol addition the reaction was cooled to 20° and acidified to pH 3.9 with 6N HCl to give a solid which was collected and washed with water and acetone to yield 14 g of crude 3-(1-methyltetrazol-5-ylthiomethyl)-7-amino-3-cephem-4-carboxylic acid.

This product (6.56 g, 0.02 mole) was suspended in 3% $NaHCO_3$ (150 ml) and acetone (150 ml) and was cooled to −15°. To this suspension was added dropwise with stirring over a 25 minute period a solution of D-dichloroacetylmandelyl chloride (5.62 g, 0.02 mole) [British Patent 962,024 (1964)] in acetone (40 ml). Stirring was continued at −15° for 30 minutes, at room temperature for one hour, and then the solution was adjusted to pH 9.3 using 5% $NaHCO_3$ and stirred for 1.5 hours. The aqueous solution was extracted with ether, layered with ethyl acetate, cooled and the pH adjusted to 1.5. The organic phase was separated and the aqueous phase extracted with ethyl acetate. The combined organic phases were dried, reduced in volume, and petroleum ether added to precipitate the solid title compound.

The product was purified by chromatography on silica gel, using a 95:5:1 chloroform: methanol: formic acid system as eluent. Traces of formic acid were removed by dissolving the prduct in ethyl acetate, washing with water, drying and evaporating the ethyl acetate in vacuo.

The sodium salt was prepared by adding a solution of sodium 2-ethylhexanoate in i-propyl alcohol to the free acid dissolved in 80:20 ethyl acetate: i-propyl alcohol. Solid was collected, washed with ether and dried.

The modal MIC of this compound against seven strains of Enterobacter aerogenes was 3.1.

EXAMPLE 2

3-(5-Methyl-1,3,4-thiadiazol-2-ylthiomethyl)-7-[D(−)-mandelamido]-3-cephem-4-carboxylic acid A solution of 15.0 g (0.034 mol) 7-(D-(−)-mandelamido)cephalosporanic acid methanolate, 4.70 g (0.036 mol) 5-methyl-2-mercapto-1,3,4-thiadiazole, and 2.99 g (0.036 mol) sodium bicarbonate in 300 ml phosphate buffer (pH 6.4) was stirred under nitrogen at 56° for 21 hr. The clear yellow solution was acidified to pH 2 with dil hydrochloric acid, and the resulting mixture extracted three times with ethyl acetate. The combined extracts were dried ($Na_2SO_4$) and concentrated in vacuo, yielding 16 g crude free acid.

This free acid was chromatographed on 170 g silica gel (deactivated with 30 g $H_2O$) and the desired product (9.44 g) was eluted with 3% methanol in chlorform.

The sodium salt was prepared by adding 2.88 g (0.020 mol) sodium 2-ethyl hexanoate in acetone-isopropanol to the free acid (9.44 g, 0.020 mol) in 100 ml acetone. The resulting precipitate was collected and dried in vacuo, yielding 7.4 g product.

EXAMPLE 3

3-(3,4-Dimethyl-1,2,4-triazol-5-ylthiomethyl)-7-(D-2-aminophenylacetamido)-3-cephem-4-carboxylic acid.

To a solution of $NaHCO_3$ (4.2 g, 0.05 mol) in water (50 ml) was added 7-ACA (6.8 g, 0.025 mol), water (50 ml), and acetone (25 ml). The resulting solution was warmed to 45° and then a solution of 3,4-dimethyl-5-mercapto-1,2,4-triazole (5.0 g, 0.038 mol) in acetone (50 ml) and 5% $NaHCO_3$ (10 ml) was added. The reaction was refluxed for 2.75 hours during which time the pH was maintained at ca. 7.6. The solution was cooled to 10° and the pH was adjusted to 3.5 with 3N HCl. The precipitated product was collected, washed with acetone, and dried to give a 60% yield of 3-(3,4-dimethyl-1,2,4-triazol-5-ylthiomethyl)-7-amino-3-cephem-4-carboxylic acid.

To a cold solution (−10°) of D-α-t-butoxycarboxamidophenylacetic acid (2.26 g, 0.013 mol) and triethylamine (1.4 ml, 0.013 mol) in dry THF (50 ml) was added with stirring isobutyl chloroformate (1.5 ml, 0.013 mol) over a 10 minute period. To this was added dropwise at −10° a cold solution of the above 7-ACA derivative triethylamine salt [prepared by adding triethylamine (1.5 ml, 0.013 mol) to a suspension of 7-ACA compound (5.0 g, 0.013 mol) in 40 ml 50% aq. THF]. The reaction solution was stirred for 1 hour at 0° and then for 1.5 hours at room temperature. The THF was evaporated, water added to the mixture, and extracted with ethyl acetate. The organic layer was discarded. The aqueous phase was cooled, layered with ethyl acetate, and acidified to pH 3 using 3N HCl. The phases were separated and aqueous phase was extracted with ethyl acetate. Evaporation of the combined and dried organic layers gave a solid. Trituration with ether-petroleum ether followed by recrystallization from methylene chloride-ether gave the pure t-butoxycarbonyl derivative.

The above product (6.5 g) was added to cold trifluoroacetic acid (65 ml) and stirred for 1 hour at 0° and then 0.5 hour at room temperature. The solution was poured slowly into a large volume of ether and the precipitated TFA salt was collected.

The TFA salt (5.3 g) was dissolved in water (25 ml) and 15 g of a polystyrene-amine ion-exchange resin (Amberlite IR-45) was added. After stirring for 1 hour at room temperature the resin was filtered off and the aqueous solution was lyophylized to yield the title compound.

An alternative procedure to obtain the zwitterion involved dissolution of the TFA salt in water, addition of methyl isobutyl ketone (MIBK) and while stirring adjustment of the solution to pH 4 using tri-n-butylamine. The solid product was collected, washed with MIBK and ethyl acetate, and dried.

The MIC of this compound against Enterobacter was 12.5.

EXAMPLE 4

When equivalent amounts of the following mercaptoheterocyclic compounds were substituted for 5-mercapto-1-methyltetrazole in the procedure of Example 1 the appropriate 3-heterocyclicthiomethyl-7-D-mandelamido-3-cephem-4-carboxylic acids were obtained.

3-mercapto-2-methyl-1,2,4-triazole (MIC against Enterobacter = 25)

3-mercapto-4,5-dimethyl-1,2,4-triazole (MIC against Enterobacter = 6)

3-mercapto-4-methyl-1,2,4-triazole (MIC against Enterobacter = 6)

3-mercapto-5-methyl-1,2,4-triazole (MIC against Enterobacter = 13)

2-mercaptothiazole 4-methyl-2-mercaptothiazole 5-methyl-2-mercaptothiazole (MIC against Enterobacter = 100)

3-methyl-5-mercaptoisothiazole (MIC against Enterobacter = 50)

4-methyl-2-mercaptooxazole (MIC against Enterobacter = 100)

5-methyl-2-mercapto-1,3,4-oxadiazole (Modal MIC against 7 strains of Enterobacter = 6.3)

3-methyl-5-mercapto-1,2,4-thiadiazole (MIC against Enterobacter = 25)

EXAMPLE 5

When an equivalent amount of 3-mercapto-1,2,4-triazole was substituted for the mercaptothiadiazole in Example 2, 3-(1,2,4-triazol-3-ylthiomethyl)-7-(D-mandelamido)-3-cephem-4-carboxylic acid was obtained. The modal MIC of this compound against 7 strains of Enterobacter was 12.5-25.

When an equivalent amount of 3-trifluoromethyl-5-mercapto-1,3,4-thiadiazole was substituted for the mercaptothiadiazole in Example 2, 7-mandelamido-3-(3-trifluoromethyl-1,3,4-thiadiazol-5-ylthiomethyl)-3-cephem-4-carboxylic acid was obtained. The MIC of this compound against Enterobacter was 12.5.

EXAMPLE 6

In the procedure of Example 3, when equivalent amounts of the following mercaptoheterocyclic compounds were substituted for the mercaptotriazole, the appropriate 3-(heterocyclicthiomethyl)-7-(D-2-aminophenylacetamido)-3-cephem-4-carboxylic acids were produced.

2-mercaptothiazole (MIC against Enterobacter = 100)

4-methyl-2-mercaptothiazole (MIC against Enterobacter = 100)

5-methyl-2-mercaptothiazole (MIC against Enterobacter = 100)

2-mercapto-2-thiazoline 5-mercaptoisothiazole (MIC against Enterobacter = 100)

5-mercapto-3-methylisothiazole (MIC against Enterobacter = 100)

4-methyl-2-mercaptooxazole (MIC against Enterobacter = 200)

3-mercapto-1,2,4-triazole (MIC against Enterobacter = 100)

4-methyl-3-mercapto-1,2,4-triazole (MIC against Enterobacter = 25)

4-methyl-5-trifluoromethyl-3-mercapto-1,2,4-triazole (MIC against Enterobacter = 25)

5-methyl-3-mercapto-1,2,4-triazole (MIC against Enterobacter = 25)

2-mercapto-1,3,4-oxadiazole (MIC against Enterobacter = 25)

5-methyl-2-mercapto-1,3,4-oxadiazole (modal MIC against 7 strains of Enterobacter was 50)

2-mercapto-1,3,4-thiadiazole (MIC against Enterobacter = 25)

5-ethyl-2-mercapto-1,3,4-thiadiazole (MIC against Enterobacter = 25)

1-methyl-5-mercaptotetrazole (modal MIC against 7 strains of Enterobacter was 6.3)

5-mercaptotetrazole (MIC against Enterobacter = 200)

EXAMPLE 7

7-(D-α-Aminophenylacetamido)-3-(5-methyl-1,3,4-thiadiazol-2-ylthiomethyl)-3-cephem-4-carboxylic acid A solution of 7-(D-α-t-butoxycarboxamidophenylacetamido)cephalosporanic acid (1.82 g, 3.59 mmol) [J. L. Spenser et al., *J. Med. Chem.*, 9, 746 (1966)] and 5-mercapto-2-methyl-1,3,4-thiadiazole (0.50 g, 3.78 mmole) [J. Sandstrom and I. Wennerbeck, *Acta. Chem. Scand.* 20, 57 (1966)] in 33 ml of phosphate buffer (pH 6.2) containing bicarbonate (0.315 g, 3.78 mmol) was heated at 57° for 23 hours. The cloudy solution was cooled to room temperature and extracted with ethyl acetate. The aqueous phase was cooled in ice, layered with ethyl acetate and acidified to pH 2.0 with 3N hydrochloric acid. The aqueous phase was extracted again with ethyl acetate and the combined, dried (MgSO₄) organic layers were evaporated in vacuo to give 0.79 g (38%) of desired product as the free acid of the t-butoxycarboxamidophenylacetamidocephalosporin. A portion of the crude product (0.50 g) was reprecipitated by dissolving it in 5% aqueous sodium bicarbonate solution followed by acidification to give the free acid (0.22 g) as an off-white solid: mp 160° (dec).

The sodium salt was prepared by treating a solution of the acid in isopropyl alcohol with a solution containing a slight excess of sodium 2-ethylhexanoate in isopropyl alcohol.

The t-butoxycarbonyl derivative (0.22 g), prepared as described above, was dissolved in 3 ml of cold trifluoroacetic acid and the solution was stirred for 30 minutes at room temperature. The excess trifluoroacetic acid was evaporated in vacuo at room temperature and the glassy residue was triturated with ether to give 77 mg of the trifluoroacetate salt of the title compound: IR (nujol) 5.65 μ (β-lactam).

The trifluoroacetate salt (77 mg) was converted to the zwitterionic form by dissolving the salt in 3 ml of water and stirring the solution at room temperature with 3 ml of a 25% solution of Amberlite LA-1 (acetate form) in methyl isobutyl ketone for 2 hours. The layers were separated and the aqueous phase was evaporated at 30° in vacuo to give 47 mg of desired product. IR (nujol) 5.65 μ (β-lactam).

The modal MIC of this compound against eight strains of Enterobacter was 12.5.

EXAMPLE 8

7-(D-α-Hydroxy-2-thienylacetamido)-3-(5-methyl-1,3,4-thiadiazol-2-ylthiomethyl)-3-cephem-4-carboxylic acid A solution of D-2-thiopheneglycolic acid (2.3 g, 0.015 mol), trimethylsilyacetamide (3.0 g, 0.023 mol) and triethylamine (2.1 ml) in dry tetrahydrofuran (25 ml) was refluxed 2 hours in a nitrogen atmosphere. The reaction solution was then cooled to −10°, stirred and isobutyl chloroformate (2.5 ml) was added dropwise; stirring was continued for 20 minutes. To this solution was added dropwise with cooling over a 30 minute period a solution of 7-amino-3-(5-methyl-1,3,4-thiadiazol-5-ylthiomethyl)-3-cephem-4-carboxylic acid (5.16 g, 0.015 mol) (prepared via a procedure similar to that in paragraph one of Example 1) and triethylamine (3 ml) in 50% aqueous tetrahydrofuran (60 ml). The reaction was stirred at −5° for 1 hour and room temperature for 1.5 hours. The tetrahydrofuran was removed in vacuo, water (50 ml) was added and the aqueous solution was extracted with ethyl acetate. This organic phase was discarded. The solution was adjusted to pH 2 and the starting 7-ACA derivative precipitated and was collected (3.3 g). The aqueous solution was extracted with ethyl acetate and the extracts were dried and evaporated to yield a semi-solid product (2.5 g). The product was dissolved in isopropyl alcohol and treated with cyclohexylamine followed by a large volume of ether. The precipitated salt was collected and recrystallized from chloroform-ether.

The MIC's of this compound against Enterobacter were 12.5 and 25.

EXAMPLE 9

7-Mandelamido-3-(1-methylimidazol-2-ylthyiomethyl)-3-cephem-4-carboxylic acid

A solution of 7.62 g of 7-mandelamidocephalosporanic acid methanolate, 2.94 g of NaHCO$_3$, and 3.0 g of 2-mercapto-1-methylimidazole in a mixture of 50 ml of water and 25 ml of acetone was maintained at reflux for 90 min. It was diluted with 75 ml of water and the pH adjusted to 3.0. The precipitate produced was filtered and washed with water to give 1.72 g of product after drying.

The MIC of this compound against Enterobacter was 50.

EXAMPLE 10

7-(2-Aminophenylacetamido)-3-(1-butyltetrazol-5-ylthiomethyl)-3-cephem-4-carboxylic acid 7-Amino-3-(1-butyltetrazol-5-ylthiomethyl)-3-cephem-4-carboxylic acid was prepared in 70% yield according to the procedure of Example 3, except that the reaction temperature was 72° and the time 1½ hours.

To a stirred suspension of 0.04 moles of this 7-amino compound in 80 ml of CH$_2$Cl$_2$, cooled to 5°, there was slowly added 10.9 ml (0.08 moles) of triethylamine. There was soon added a solution of 16.7 g (0.04 moles) of D-(−)-N-t-butoxycarbonylphenylglycine 2,4-dinitrophenyl ester in 20 ml CH$_2$Cl$_2$. After stirring at 25° overnight, the CH$_2$Cl$_2$ was removed in vacuo (20°), and 500 ml of ethyl acetate was added to the residue. The resulting solution was washed with 100 ml 1N HCl, the organic layer separated and dried, and the solvent removed to give 7-N-t-butoxycarbonylaminophenylacetamido-3-(1-butyltetrazol-5-ylthiomethyl)-3-cephem-4-carboxylic acid.

This acid was converted to the free amino product by reaction with cold trifluoroacetic acid (1:10 w/v) for 20 minutes. Excess trifluoroacetic acid was removed in the cold, and the residue triturated with ether to give the trifluoroacetate salt as a white solid. This salt was dissolved in a small amount of water to which a drop of concentrated HCl had been added, and any insoluble material filtered off. The filtrate was basified to pH 3.9 and the product collected by filtration.

This compound had an MIC of 200 against Enterobacter.

EXAMPLE 11

7-mandelamido-3-(4-methyl-3-trifluoromethyl-1,2,4-triazol-5-ylthiomethyl)-3-cephem-4-carboxylic acid To a cooled solution of O-tetrahydropyranylmandelic acid (4.73 g, 0.02 mol) and N-hydroxysuccinimide (2.3 g, 0.02 mol) in anhydrous THF was added dicyclohexylcarbodiimide (4.12 g, 0.02 mol). After stirring for 7 hours at ice bath temperature, the reaction was allowed to stand at room temperature overnight. The dicyclohexylurea was removed by filtration and the filtrate was evaporated to yield the succinimide ester.

7-Amino-3-(4-methyl-3-trifluoromethyl-1,2,4-triazol-5-ylthiomethyl)-3-cephem-4-carboxylic acid was prepared according to the procedure of Example 3 by substituting 5-mercapto-4-methyl-3-trifluoromethyl-1,2,4-triazole for 3,4-dimethyl-5-mercapto-1,2,4-triazole.

To a cooled solution of this 7-aminocephem compound (6.3 g, 0.016 mol) in 80 ml of dry pyridine containing 3.4 g triethylamine was added the succinimide ester (5.5 g, 0.016 mol). The reaction was stirred 3 hours at room temperature and then poured into 600 ml water that had been acidified to pH 2. The precipitated solid was collected, dissolved in ethyl acetate, and separated from insoluble material. Concentration gave the product which was purified further by trituration with ether-petroleum ether.

The above product (4.9 g, 0.0078 mol) was stirred in ice cold trifluoroacetic acid (14 ml) for 45 minutes. The trifluoroacetic acid was removed in vacuo and the residue triturated with ether to yield the solid title compound, m.p. 135°–138°.

The MIC of this compound against Enterobacter was 6.3.

EXAMPLE 12

An injectable composition is formed by adding 2 ml sterile water or sterile isotonic saline to 500 mg of the cephalosporin sodium salt.

EXAMPLE 13

An antibacterial capsule has the following components:

| | |
|---|---|
| cephalosporin | 500 mg |
| lactose | 250 mg |
| magnesium stearate | 75 mg |

What is claimed is:

1. A method for combatting Enterobacter infections comprising administering to a warm-blooded mammal infected with an Enterobacter infection an effective amount for treating said Enterobacter infection of a composition comprising a cephalosporin of the formula:

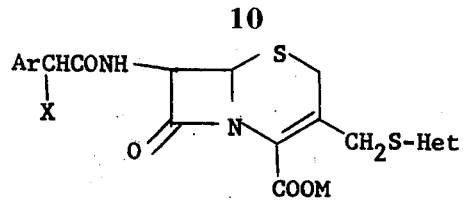

where
  Ar is phenyl or thienyl;
  X is OH or $NH_2$;
  M is H or an alkali metal or ammonium cation; and
  Het is 1,3,4-thiadiazole or tetrazole, unsubstituted or substituted with a lower alkyl or trifluoromethyl group,
and a suitable pharmaceutical carrier.

2. A method as set forth in claim 1 where Ar is phenyl, M is H, and X is OH.

3. A method as set forth in claim 2 where Het is 5-methyl-1,3,4-thiadiazol-2-yl.

4. A method as set forth in claim 2 where Het is 1-methyltetrazol-5-yl.

5. A method as set forth in claim 1 where Ar is phenyl, M is H, and X is $NH_2$.

6. A method as set forth in claim 5 where Het is 1-methyltetrazole-5-yl.

7. A method as set forth in claim 5 where Het is 5-methyl-1,3,4-thiadiazol-2-yl.

8. A method as set forth in claim 1 where Ar is thienyl.

9. A method as set forth in claim 4 where M is an alkali metal cation.

* * * * *